United States Patent Office 3,366,871
Patented Jan. 30, 1968

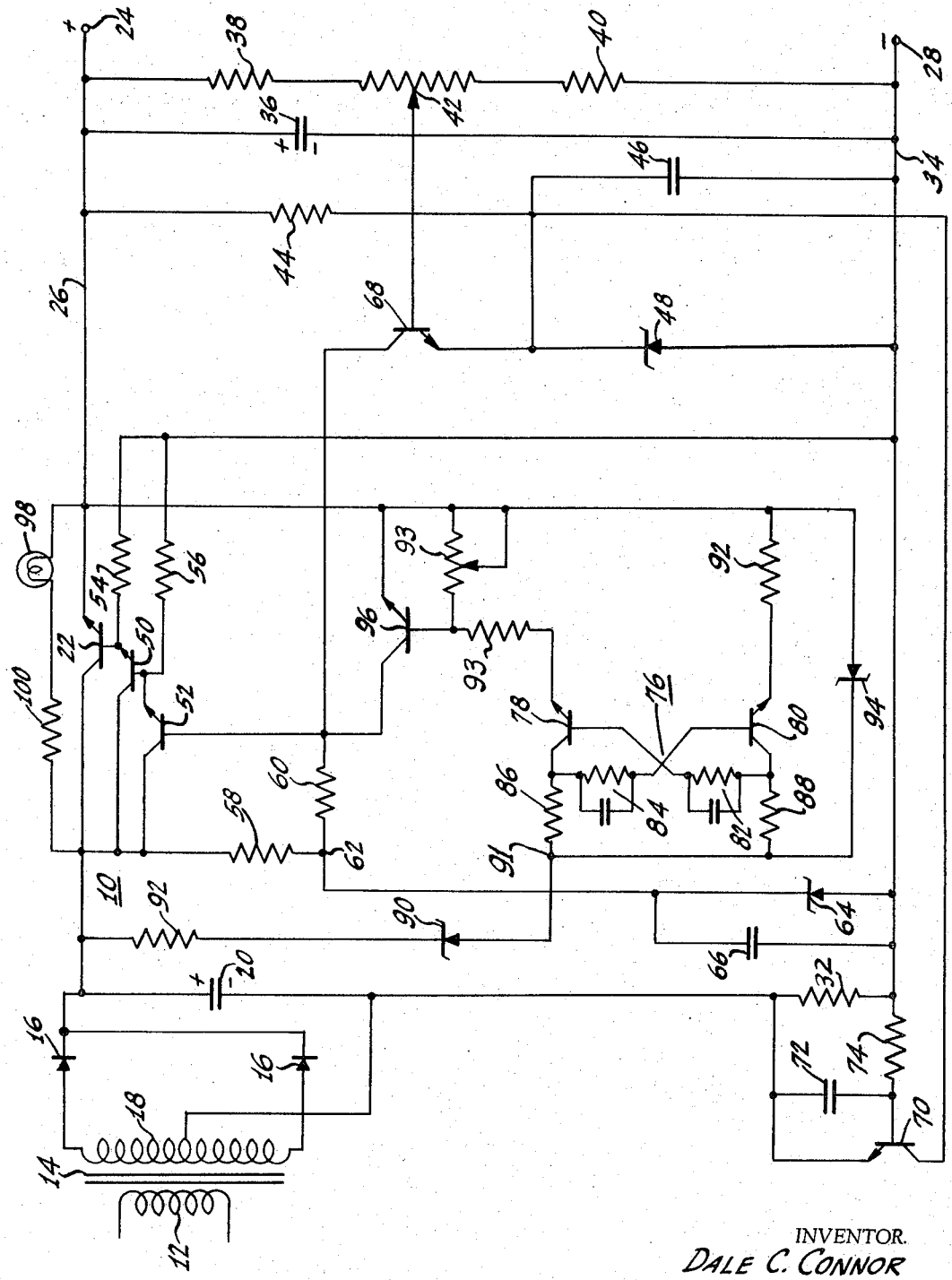

3,366,871
OVERLOAD AND SHORT-CIRCUIT PROTECTION
FOR VOLTAGE REGULATED POWER SUPPLY
Dale C. Connor, Washington, Pa., assignor to Radio Corporation of America, a corporation of Delaware
Filed Mar. 29, 1965, Ser. No. 443,299
5 Claims. (Cl. 323—9)

ABSTRACT OF THE DISCLOSURE

A voltage regulator is provided which includes means for limiting the current fed to the load supplied thereby upon the occurrence of a short circuit or an overload, and which includes, in addition, an oscillator means to turn the voltage regulator off and on periodically during the duration of the short circuit or overload.

---

This invention relates to direct current voltage regulated power supplies and more specifically to such power supplies which incorporate overload and short-circuit protection.

When the output of a voltage regulated power supply is short-circuited or overloaded, the voltage thereacross drops to zero or to below the set voltage thereof, yet the power supply attempts to continue to supply its overloaded output with the voltage for which it is set. This action results in the power supply providing more current than its rated value, whereby components of the power supply can be damaged. If means are provided for turning off the power supply when its output is short-circuited, it may be necessary for an operator to notice that the power supply is off and to turn the power supply on again after the short-circuit or overload has been cleared.

Voltage regulated power supplies are known which include means for turning off the power supply when their output circuits are overloaded and for turning the power supply on periodically thereafter to determine if the short-circuit still continues, and for causing the power supply to continue to remain on when the short-circuit or overload is removed. However, such power supplies so equipped include oscillators which are continuously energized by sources of energy individual to the oscillators. If this individual source of energy should fail, the regulated power supply will not be turned off responsive to its output being short-circuited, whereby short-circuit protection of the power supply will fail. Furthermore, since the components of the oscillator continually carry current, the components continually wear, whereby the oscillator can fail due to failure of a component.

It is an object of this invention to provide an improved voltage regulated power supply including short-circuit and overload protection means.

It is a further object to provide an improved voltage regulated power supply which turns itself off upon the occurrance of a short-circuit or an overload and which periodically checks for the continuing occurrence of the overload and which turns itself on which the overload is removed.

It is still a further object to provide such an improved voltage regulated supply in which no additional or individual source of voltage is required to energize the means for periodically checking for the continuing occurrence of the overload.

It is another object of this invention to provide such an improved voltage regulated power supply in which no current flows through the means for checking the continuance of the overload when the power supply is operating normally.

It is an additional object to provide an improved voltage regulated power supply in which the series regulating transistor is protected from the occurrence of input over-voltage.

In accordance with this invention, upon occurrence of a short-circuit or overload in the output of the voltage regulator, the excessive current flowing in the output circuit causes the impedance of the series regulating impedance comprising a part of the voltage regulated supply to be increased to a point where the output current is limited to a predetermined maximum, whereby the voltage drop across the series regulating impedence rises to a predetermined value. The voltage appearing across the series regulating impedance is caused to energize an oscillator, which causes blocking of the series regulating impedance for the major portion of the cycle of operation of the oscillator and causes unblocking of the series regulating impedance for the remainder of the cycle. The ratio of the on-to-off time of the series regulating impedance is so chosen that the average energy absorbed in the series regulating impedance over the duration of the overload is below the rated value of the dissipation for the series regulating impedance. The current limiting portion of the power supply continues to limit the maximum current through the series regulating impedance, when conductive, to the predetermined, safe, maximum value. When the short or overload is removed, the current limiting portion no longer causes the series regulating impedance to exhibit a high impedance and the voltage supply is removed from the oscillator, whereby, within the period of one cycle of operation of the oscillator, the voltage regulated power supply operates normally to provide voltage regulated current to the load connected to its output terminals. Since no voltage is applied to the oscillator except during short-circuit or overload conditions of the power supply, the oscillator elements carry no operating currents except during such short-circuit or overload conditions, whereby the oscillator elements have an extended life. Furthermore, since the voltage supply of the oscillator is that developed across the series regulating element, no additional or individual voltage supply is required for the oscillator. In addition, if the A.C. input voltage provided for the voltage regulated supply goes so high that in normal operation of the regulated supply, the voltage drop across the series regulating impedance becomes sufficient to cause excessive dissipation and resultant injury to it, the voltage thereacross will energize the oscillator to cause it similarly to block the series regulating impedance, for the duration of the A.C. overvoltage, thereby protecting the series regulating impedance.

The novel features of the invention, both as to its organization and method of operation, as well as additional objects and advantages thereof, will be understood more readily from the following description when read in conjunction with the single figure of the drawing which is a circuit diagram of an overload and short-circuit protected voltage regulated current supply constructed according to one embodiment of this invention.

An alternating current source (not shown) for the regulated supply 10 is connected across the primary winding 12 of a transformer 14. The anodes of two rectifiers 16, 16 are respectively connected to the two terminals of the secondary winding 18 of the transformer 14. The cathodes of these rectifiers 16 are connected together and to a first or positive terminal of a filter capacitor 20. The other or negative terminal of the filter capacitor 20 is connected to the center tap of the secondary winding 18. The positive terminal of the capacitor 20 is connected to the collector of an NPN transistor 22, the emitter of which is connected to the positive output terminal 24 of the voltage regulated supply 10 by way of the positive bus 26. All transistors illustrated in the figure are of the NPN type. The negative terminal of the capacitor 20 is also connected to the negative terminal 28 of the supply 10 through a current sensing resistor 32, and the negative bus 34 in tandem. A filter capacitor 36, in parallel with the series combination of two fixed resistors 38 and 40 and an intervening potentiometer 42 are connected across the terminals 24 and 28 of the regulated supply 10. The series combination of a resistor 44 and a further filter capacitor 46 is also connected across the output terminals 24 and 28, a Zener diode 48 being connected in parallel with the filter capacitor 46, whereby, in the operation of the supply 10, a reference voltage appears across the Zener diode 48.

Two other transistors 50 and 52 are connected with the series regulating impedance comprising the transistor 22. The collectors of the two transistors 50 and 52 are each connected to the collector of the series regulating transistor 22. The emitter of the transistor 50 is connected to the base of the transistor 22 and to the negative bus line 34 through a resistor 54. The emitter of the transistor 52 is connected to the base of the transistor 50 and to the negative bus line 34 through a resistor 56. The collector of the transistor 52 is also connected to its base through the two resistors 58 and 60 in series, and the junction 62 of the two resistors 58 and 60 is connected to the negative bus 34 through the parallel combination of a Zener diode 64 and a filter capacitor 66, which help to stabilize the voltage supplied to the resistor 60.

An amplifying and control transistor 68 is provided having its collector connected to the base of the transistor 52 and its emitter connected to the junction of the Zener diode 48 and the capacitor 46. The base of the control transistor 68 is connected to the slider of the potentiometer 42.

The operation of the circuit so far described is as follows: an adjustable portion of the potential appearing between the output terminals 24 and 28 of the voltage regulating supply 10 is applied to the base of the transistor 68. This voltage is compared with a reference potential appearing across the Zener diode 48. If the voltage on the base of the transistor 68 is greater (more positive) than the voltage on its emitter, the control transistor 68 becomes more conductive and the transistors 52, 50, and 22 all become less conductive, whereby the voltage across the output terminals 24 and 28 tends to drop off. If the voltage on the base of the control transistor 68 decreases with respect to the control potential applied to the emitter thereof, the transistors 52, 50, and 22 become more conductive and the voltage across the output terminals 24 and 28 tends to go up. The result is that the voltage across the output terminals 24 and 28 remains at a steady value determined by the setting of the potentiometer 42.

If a short-circuit or overload should occur across the output terminals 24 and 28, then, in the circuit so far described, the transistors 52, 50 and 22 would be made fully conductive in an attempt to raise the voltage applied to the output terminals 24 and 28 to the value determined by the setting of the potentiometer 42. During a short-circuit or overload, the voltage across the output terminals 24 and 28 is reduced, the current flow through the series regulating transistor 22 would be high and the voltage drop across it would be high whereby the energy absorbed by the series regulating transistor 22 could be in excess of its maximum rated value of dissipation which would cause damage thereto. Means are provided to limit the current flow through the series regulating transistor 22 upon occurrence of a short-circuit or overload across the output terminals 24 and 28. This means includes the current sensing resistor 32.

A transistor 70 is provided whose emitter is connected to the negative terminal of the filter capacitor 20. The base of the transistor 70 is connected to its emitter through a smoothing capacitor 72, and this base is also connected to the junction of the negative bus 34 and the resistor 32 through an additional resistor 74. The collector of the transistor 70 is connected to the emitter of the control transistor 68. When the current flowing into the load (not shown) connected across the output terminals 24 and 28 tends to be excessive, the voltage drop across the resistor 32 rises to the point where the transistor 70 is made conductive, applying a shunt across the Zener diode 48, and the reference potential appearing across the Zener diode 48 drops. When the reference potential drops, the control transistor 68 causes the series regulating transistor 22 to increase in impedance to maintain the current therethrough at a constant maximum value. Due to the non-linear current v. voltage characteristic of the transistor 70, the transistor 70 acts as a threshold device, and has no effect on the voltage regulated supply until the current supplied thereby reaches its rated value, but then limits the maximum current supplied by the source 10 to a small amount over its rated value. However, with a high voltage drop across the series regulating transistor 22 (due to its impedance being increased) and with a high, limited, current flowing therethrough, a heavy overload is applied to the series regulating transistor 22, which may thereby be damaged. Therefore, in the absence of the further apparatus to be described, when a short-circuit or overload is applied to the voltage regulated supply 10, the series regulating impedance 22 is overloaded for the duration of the short-circuit or overload.

Further means are provided to protect the series regulating impedance 22 for the duration of the short-circuit or overload. The protective means for the series regulating impedance 22 comprises an oscillator 76, means for energizing it, and means for coupling the oscillations produced thereby to the series regulating impedance 22.

The oscillator 76 may be a multivibrator comprising two transistors 78 and 80. The base of the transistor 78 is connected to the collector of the transistor 80 through a parallelly connected RC circuit 82 and the base of the transistor 80 is connected to the collector of the transistor 78 through a second parallelly connected RC circuit 84. The collectors of the transistors 78 and 80 are connected together through respective resistors 86 and 88.

The multivibrator 76 is energized by a connection from the positive terminal of the filter capacitor 20 through a Zener diode 90 and a current limiting resistor 92 connected in series to the junction 91 of the resistors 86 and 88, and from the emitter of the series regulating transistor 22 to the emitters of the transistors 78 and 80 through individual load resistors 93 and 92. The load resistor 93 may comprise a fixed and variable portion in series as shown. The junction 91 is also connected to the emitter of the series regulating transistor 22 through a protective Zener diode 94 which acts to protect the oscillator 76 from over voltages.

The junction of the variable and the fixed portions of the resistor 93 is connected to the base of a transistor 96. The emitter of the transistor 96 is connected directly to the emitter of the series regulating transistor 22. The collector of the transistor 96 is connected to the collector of the control transistor 68.

A signal lamp 98 and a current limiting resitsor 100 are connected in series across the main electrodes comprising the collector and emitter of the series regulating transistor 22 for a purpose to be described.

When the series regulating transistor 22 is conductive in a normal manner, the voltage drop thereacross is insufficient to cause noticeable illumination of the signal lamp 98, and this voltage is too low to break down the Zener diode 90. Therefore, little or no current flows through the signal lamp 98, and no current flows through the Zener diode 90 when the regulator is supplying voltage regulated current in a normal manner to its output terminals 24 and 28, and therefore no voltage is applied to the oscillator 76 and no current flows through its components. When, due to excessively high current flowing in the current sensing resistor 32, the impedance of the series regulating transitsor 22 is raised to the point of limiting the output current at a value just above the rated output of the voltage regulated source 10 (as discussed above), the voltage across the series regulating transistor 22 goes up to the point where the signal lamp 98 is illuminated, indicating the presence of an overload or short-circuit. Also the Zener diode 90 breaks down, whereby a voltage is applied across the several circuit components comprising the oscillator 76, causing it to oscillate. A portion of the oscillation output of the oscillator 76, appearing at the emitter of the transistor 78, is applied between the base and emitter of the transistor 96 by the variable portion of the resistor 93 to render the transistor 96 conductive and non-conductive alternately, and thereby to render the series transistor 22 non-conductive and conductive alternately. The frequency of the oscillator 76 may be about one cycle per second, and its duty cycle, as applied to the transistor 96, may be about 2 and a half percent, whereby the series transistor 22 is rendered conductive to supply current to the output terminals in short evenly spaced pulses for about 2 and a half percent of the time that the output remains short-circuited or overloaded. No damage occurs in the series regulating transistor 22 during short-circuit or overload conditions since the average current flow in the transistor 22 is below the rated maximum value thereof. During the time that the transistor 22 is made conductive by the oscillator 76, that is during the time the transistor 78 is non-conductive, the current through the transistor 22 is limited, as noted above, by action of the transistor 70. During this conduction of the transistor 22, the voltage thereacross goes down, whereby the intensity of the light 98 decreases but it does not go off. The voltage across the transistor 22 is still sufficient to break down the Zener diode 90 and the oscillator 76 is still energized. The periodic change of intensity of the light 98 indicates that the oscillator 76 is operating to turn the transistor on for a short interval in spite of the continuing short-circuit. During the period of continuing short-circuit or overload, the voltage across the transistor 22 is such that the oscillator 76 continues to oscillate. When the short-circuit or overload is cleared, the voltage across the load will go up and the voltage across the transistor 22 will go down and the light 98 will go off. Due to the drop of voltage across the transistor 22, the Zener diode 90 does not pass current and no voltage will be applied to the oscillator 76. The current flow through the transistor 22 reduces to the rated value thereof or lower and the transistor 70 becomes non-conductive. The voltage applied to the base of the transistor 22 is then determined by the setting of the potentiometer, that is, the regulated supply acts normally.

If the voltage of the A.C. supply (not shown), connected to the primary winding 12 increases to the point where the voltage across the series regulating transistor 22 is sufficient to light the signal lamp 98 and to break down the Zener diode 90, the oscillator 76 causes blocking of the transistor 22 during about 97 and a half percent of the duration of the excessively high input voltage. Therefore, during the occurrence of excessive high input voltage to the supply 10, the series regulating impedance 22 thereof is protected from damage due to excessive dissipation. When the A.C. supply voltage drops to its normal value, the voltage across the transistor 22 also drops to the point where the Zener diode 90 is not broken down and (in the absence of an overload or short-circuit) the voltage regulated source 10 operates in a normal manner.

Although only a single overload and short-circuit protected voltage regulated supply has been described, variations are possible within the spirit of the present invention. For example, while all transistors have been shown and described as being NPN type, by appropriate reversal of potentials or of circuit connections, PNP type may be used. If the series regulating transistor 22 has sufficient current multiplication, the junction of the collectors of the transistors 68 and 96 may be connected directly to the base of the series transistor 22, in which case the transistors 50 and 52 and the resistors 54 and 56 connected thereto may be omitted. Hence it should be understood that the foregoing description is to be considered as illustrative and not in a limiting sense.

What is claimed is:

1. An overload and short-circuit protected voltage regulation power supply comprising:
   a pair of input terminals to be connected to a source of unregulated direct voltage,
   a pair of output terminals for said supply,
   respective connections between said input and output terminals including a series regulating impedance between one of said pair of input terminals and one of said pair of output terminals, and a current sensing resistor between an input and an output terminal,
   a reference voltage means,
   means for comparing at least a portion of the output voltage appearing across said output terminals with the reference potential across said reference voltage means,
   means responsive to said comparing means for varying the impedance of said series regulating impedance in a sense to maintain the voltage across said output terminals at a constant value, and
   means responsive to a predetermined current flowing through said current sensing resistor for decreasing the voltage provided by said reference voltage means, whereby the current supply by said regulated supply is limited to a maximum value.

2. An overload and short-circuit protected regulated direct current supply comprising:
   a pair of input terminals to which an unregulated direct current may be applied,
   a pair of output terminals,
   respective connections between said input and said output terminals,
   said connections including a series regulating impedance and a current sensing resistor,
   means for varying the impedance of said series regulating impedance in response to a variation in the voltage across said output terminals,
   means responsive to a predetermined flow of current in said current sensing resistor to increase the impedance of said series regulating impedance, whereby the voltage across said series regulating impedance increases,
   an oscillator and a voltage threshold device connected in series across said series regulating impedance, said oscillator producing oscillations when the voltage threshold of said voltage threshold device is exceeded, and
   means for applying said oscillations to said series regulating impedance to render it alternately conductive and nonconductive whereby the average energy dissipation in said series regulating impedance is reduced.

3. An overload and short-circuit protected voltage regulated direct current supply comprising:
   a pair of input terminals to which an unregulated direct current source may be connected,
   a pair of output terminals,
   a transistor having a pair of main electrodes and a control electrode,
   a connection between one of said input terminals and one of said output terminals including said main electrodes,
   a connection between the other of said input and output terminals,
   one of said connections including a current sensing resistor,
   a potentiometer connected across said output terminals.
   a resistor and a voltage threshold device connected across said output terminals, a second transistor having a pair of main electrodes and a control electrode, a connection between said control electrode of said second transistor and the slider of said potentiometer, a connection between one of the main electrodes of said second transistor and the junction of said resistor and said threshold device, a connection between the other main electrode of said second transistor and the control electrode of said first transistor, a third transistor having a pair of main electrodes connected across said voltage threshold device and a control electrode, connections for applying the voltage developed across said current sensing resistor between the control electrode and one of the main electrodes of said third transistor, a second voltage threshold device and an oscillator connected in series across the main electrodes of said first transistor, and connections for applying the oscillations produced by said oscillator between the control electrode and a main electrode of said first transistor.

4. A regulated direct current supply comprising:

a pair of input terminals to which an unregulated direct current source may be connected, a pair of output terminals, a transistor having a pair of main electrodes and a control electrode, a connection between one of said input terminals and one of said output terminals including said main electrodes, a connection between the other of said input and output terminals, a voltage threshold device and an oscillator connected in series across the main electrodes of said transistor, and connections for applying the oscillations produced by said oscillator between the control electrode and a main electrode of said transistor.

5. An overload and short-circuit voltage regulated direct current supply comprising:

a pair of input terminals to which an unregulated direct current source may be connected, a pair of output terminals, a transistor having a pair of main electrodes and a control electrode, a connection between one of said input terminals and one of said output terminals including said main electrodes, a connection between the others of said input and output terminals, one of said connections including a current sensing resistor, a second transistor having a pair of main electrodes and a control electrode, connections for applying the voltage developed across said current sensing resistor between the control electrode and one of the main electrodes of said second transistor, connection means between a main elctrode of said second transistor and the control electrode of said first transistor to apply a current limiting current to the control electrode of said first transistor upon occurrence of a current of predetermined magnitude in said current sensing resistor, whereby the voltage across said first transistor increases, a voltage threshold device and an oscillator connected in series across the main electrodes of said first transistor, and connections for applying the oscillations produced by said oscillator upon breakdown of said threshold device between the control electrode and a main electrode of said first transistor to render it alternately nonconductive and conductive.

References Cited

UNITED STATES PATENTS

| 3,122,697 | 2/1964 | Kauders | 317—33 X |
| 3,147,400 | 9/1964 | McClay | 317—22 |
| 3,217,207 | 11/1965 | Webb | 317—31 X |
| 3,235,787 | 2/1966 | Gordon et al. | |
| 3,240,997 | 3/1966 | Burgi et al. | 323—9 X |
| 3,303,386 | 2/1967 | Murphy | 317—31 |
| 3,303,387 | 2/1967 | Springer | 317—31 |

JOHN F. COUCH, *Primary Examiner.*

A. D. PELLINEN, *Assistant Examiner.*